US011535527B2

(12) United States Patent
Gaedker et al.

(10) Patent No.: US 11,535,527 B2
(45) Date of Patent: Dec. 27, 2022

(54) GREY-WATER PROCESSING DEVICE FOR RAIL VEHICLES

(71) Applicant: SIEMENS MOBILITY GMBH, Munich (DE)

(72) Inventors: Simon Gaedker, Glandorf (DE); Frank Hugemann, Krefeld (DE); Andreas Haeussler, Solingen (DE); Thomas Kuebeck, Grefrath (DE)

(73) Assignee: Siemens Mobility GmbH, Munich (DE)

( * ) Notice: Subject to any disclaimer, the term of this patent is extended or adjusted under 35 U.S.C. 154(b) by 431 days.

(21) Appl. No.: 16/334,800

(22) PCT Filed: Sep. 13, 2017

(86) PCT No.: PCT/EP2017/072995
§ 371 (c)(1),
(2) Date: Mar. 20, 2019

(87) PCT Pub. No.: WO2018/054735
PCT Pub. Date: Mar. 29, 2018

(65) Prior Publication Data
US 2020/0017371 A1    Jan. 16, 2020

(30) Foreign Application Priority Data
Sep. 20, 2016    (DE) .......................... 102016218002.9

(51) Int. Cl.
C02F 1/00        (2006.01)
B01D 29/03       (2006.01)
(Continued)

(52) U.S. Cl.
CPC ............. *C02F 1/004* (2013.01); *B01D 29/03* (2013.01); *B01D 29/6484* (2013.01);
(Continued)

(58) Field of Classification Search
CPC ............... C02F 1/004; C02F 2103/002; C02F 2201/001; C02F 2201/008; C02F 2201/34;
(Continued)

(56) References Cited

U.S. PATENT DOCUMENTS 3,594,825 A * 7/1971 Reid ....................... B60R 15/00
                                                          4/663
5,692,250 A   12/1997 Oldfelt et al.
(Continued)

FOREIGN PATENT DOCUMENTS

DE    4123803 A1   1/1993
DE    68927589 T2  6/1997
(Continued)

OTHER PUBLICATIONS

DE102013205084B3—EPO Machine Translation (Year: 2020).*

*Primary Examiner* — Patrick Orme
(74) *Attorney, Agent, or Firm* — Laurence A. Greenberg; Werner H. Sterner; Ralph E. Locher

(57) ABSTRACT

A processing device for grey water for a rail vehicle includes a grey water container, a grey water supply in an inlet region, a drain for processed grey water in an outlet region, and a slotted filter between the inlet and outlet regions that has at least one movable sliding member which touches the base of the grey water container in a lowered position and is lifted off the base in a raised position. The base of the grey water container rises from the inlet region to the outlet region. A cleaning outflow is disposed in the inlet region on the base side. A fresh water supply for supplying fresh water is disposed in the outlet region. A rail vehicle having at least one processing device for grey water for a toilet module or toilet bowl is also provided.

11 Claims, 5 Drawing Sheets

(51) Int. Cl.
  *B01D 29/64* (2006.01)
  *B61D 35/00* (2006.01)
  *C02F 103/00* (2006.01)
(52) U.S. Cl.
  CPC ........ *B61D 35/00* (2013.01); *C02F 2103/002* (2013.01); *C02F 2201/001* (2013.01); *C02F 2201/008* (2013.01); *C02F 2209/42* (2013.01); *C02F 2303/16* (2013.01)
(58) Field of Classification Search
  CPC .. C02F 2209/42; C02F 2303/16; B61D 35/00; B61D 35/005; E03D 5/003
  See application file for complete search history.

(56) References Cited

U.S. PATENT DOCUMENTS

2012/0325754 A1* 12/2012 Christy .............. B01D 21/2444
  210/744
2013/0305444 A1  11/2013 Boodaghians et al.
2017/0226726 A1  8/2017 Schless

FOREIGN PATENT DOCUMENTS

| | | |
|---|---|---|
| DE | 102012023683 A1 | 5/2014 |
| DE | 102013205084 B3 * | 5/2014 |
| DE | 102013205084 B3 | 5/2014 |
| EP | 2484574 B1 | 8/2013 |
| EP | 2873583 A1 | 5/2015 |
| EP | 2937480 A1 | 10/2015 |
| RU | 180330 U1 | 6/2018 |

* cited by examiner

GREY-WATER PROCESSING DEVICE FOR RAIL VEHICLES

BACKGROUND OF THE INVENTION

Field of the Invention

The invention relates to a grey water processing device for a rail vehicle, having a grey water container, a grey water supply in an inlet region, a drain for processed grey water in an outlet region and between the inlet and outlet region a slotted filter which has at least one movable sliding member which in a lowered position touches the base of the grey water container and in a raised position is raised from it, wherein the base of the grey water container rises from the inlet region to the outlet region and wherein a cleaning outflow is arranged at the base side in the inlet region.

Such a grey water processing device is known from DE 10 2013 205 084 B3. The grey water from a washbasin can now no longer simply be diverted onto the track or supplied to a waste water tank, but instead it can be collected, processed and provided for a WC module as flushing water. As a result of the cylindrically symmetrical construction, however, the device is complex to produce and to clean during operation.

SUMMARY OF THE INVENTION

An object of the invention is to provide a processing device for grey water which is cost-effective to produce and to operate.

The object is achieved with the subject-matter of the independent patent claim described below. Developments and embodiments of the invention will be appreciated from the features of the dependent patent claims.

A processing device according to the invention for grey water for a rail vehicle comprises a grey water container with a grey water supply in an inlet region of the grey water container, a drain for processed grey water in an outlet region of the grey water container and a slotted filter between the inlet and the outlet region. The slotted filter has in this instance at least one movable sliding member. The sliding member touches with the lower end thereof in a lowered position a base of the grey water container. In a raised position, however, the lower end is raised from the base of the grey water container so that a gap is released between the sliding member and the base. The base of the grey water container is constructed to rise from the inlet region to the outlet region. Consequently, the base of the grey water container in the outlet region is arranged to be raised with respect to the base of the grey water container in the inlet region. The natural flow direction of water is consequently from the outlet region toward the inlet region. A cleaning outflow is arranged at the base side in the inlet region. The opening of the cleaning outflow is located according to an embodiment in the plane of the base and is free from any offset relative thereto. However, a fresh water supply for supplying fresh water is according to the invention arranged in the outlet region. The outlet region can be used as a reservoir for WC flushing water. The slotted filter further comprises in addition to the at least one sliding member at least one slotted member which is associated with the at least one sliding member and which is in particular fixed. The slotted member and the sliding member are arranged in such a manner with respect to each other in the grey water container that at least in the lowered position of the sliding member a gap is formed between the slotted member and the sliding member so that in the inlet region grey water which is intended to be filtered has to flow through the gap in order to reach the outlet region. The grey water which is partially charged with sediment has to flow vertically upward in the gap via the sliding member. Sediment is thereby separated from the grey water and falls and accumulates on the base of the grey water container. The slotted filter consequently serves to filter sediment from the grey water in order to be able to supply the filtered, processed grey water to another process, in particular a flushing of a toilet.

The processing device may in a development have a filling level sensor which is advantageously arranged in the outlet region. This sensor is at least constructed to detect a limit level of processed grey water.

So that sufficient water for flushing the WC module is always available, there is provided the filling level sensor which detects as soon as there is no longer sufficient processed grey water in the container so that the fresh water supply is opened until the minimum level has been reached again. The fresh water supply serves at the same time to clean the container in order to flush out the sediments with the cleaning outflow open and the sliding members raised.

To this end, the grey water container is in a development constructed in an elongate manner, with the inlet region at one side and the outlet region at the other side and the slotted filter therebetween. The inlet region, slotted filter and outlet region are connected in series along a longitudinal axis of the grey water container. Consequently, one cleaning outflow in the inlet region to discharge back-flushed sediment and one drain for processed grey water are sufficient. A single fresh water supply in the outlet region is also sufficient to flush deposited sediment with supplied fresh water via the sloping base to the cleaning outflow. A processing device which is constructed in this manner for grey water is more cost-effective to produce in comparison with a cylindrically symmetrically constructed processing device for grey water and furthermore even simpler to clean which additionally reduces maintenance costs.

According to another development of the invention, the fresh water supply is directed against a wall of the grey water container, for example, against an end wall of the grey water container which is arranged remote from the inlet region, or against a first jet breaker which is arranged in the grey water container and which is thus orientated toward the fresh water supply so that a fresh water jet which is discharged through the fresh water supply into the grey water container is split. In this instance, the fresh water jet particularly strikes the wall or the first jet breaker directly and is thereby, in particular widely, split. The wall or the first jet breaker acts as a distributor of the fresh water in the grey water container. In addition to dividing, the wall or the first jet breaker serves to brake the fresh water flow.

Another development of the invention involves the drain for processed grey water being arranged in the outlet region, in particular at the base side, wherein an opening of the drain for the passage of processed grey water into the drain is arranged spaced apart from the base of the grey water container. The opening of the drain is consequently raised with respect to the base of the grey water container.

For example, the drain has a pipe which is guided through the base of the grey water container and which protrudes into the grey water container. The opening of the drain is then accordingly the opening of the pipe located in the grey water container. Therefore, the drain then has a pipe which is guided through the base in the outlet region of the grey water container and which protrudes into the outlet region of the grey water container, wherein a free opening of the pipe for the passage of processed grey water into the drain is raised with respect to the base of the grey water container.

The opening of the drain is then located, for example, in a horizontal plane so that the processed grey water flows away in the direction of acceleration due to gravitational force through the discharge opening into the drain. The base may also in the region of the drain for processed grey water be constructed to be horizontal so that the opening of the drain and the base of the grey water container extend parallel with each other, but with a predetermined minimum spacing with respect to each other.

The thickness of the pipe wall is in a development negligibly small in comparison with the length of the pipe within the grey water container.

The drain which is raised over the base has the advantage that processed grey water which is pouring out does not carry any sediment which is deposited on the base. The prior art according to DE 10 2013 205 084 B3 also discloses a base with a central raised portion from which a drain extends, but not a drain which is recessed vertically upward from the base. It is thereby possible for subsequent lines to the toilet which are flushed with the processed grey water to become blocked less often, which results in reduced maintenance costs.

In another development, the grey water container has between the inlet region and outlet region and consequently in the region of the slotted filter side walls which are orientated substantially parallel with each other and which are consequently located in substantially parallel planes. The at least one sliding member is constructed in a substantially plate-like manner. It is additionally arranged substantially perpendicularly to the side walls in the grey water container. In particular, a plurality or even all of the sliding members are constructed in a plate-like manner and in particular a plurality of sliding members and the fixed slotted members which are associated with the respective sliding members, potentially even all the sliding members and all of the slotted members of the slotted filter which are associated with the sliding members, stand perpendicularly on the side walls. A plate-like sliding member has in comparison with the width and the height thereof a negligible thickness and is therefore considered to be approximately planar.

In a development, the side walls of the grey water container have guides for movably guiding the at least one plate-like sliding member. The at least one plate-like sliding member is laterally enclosed and guided in the guides perpendicularly to the plate-like sliding member, that is to say, forces acting perpendicularly on the plate-like sliding member are absorbed by the guides and directed into the grey water container. Since the plate-like sliding member is in particular orientated vertically in the grey water container, the thickness and width thereof are consequently measured in a horizontal direction, but the height thereof is measured in a vertical direction, it is therefore guided horizontally. At the same time, the guides enable a movement of the sliding member in a vertical direction or a movement of the sliding member with at least one direction component in a vertical direction.

If a plurality of slotted members and sliding members are provided, the so-called slotted member path is arranged longitudinally. The grey water which is intended to be filtered flows from the inlet region along a longitudinal plane of the grey water container to the outlet region.

Another development of the invention involves the at least one sliding member having on a face which faces a slotted member which is in particular fixedly arranged in the grey water container, a resilient lip which extends in particular horizontally and which consequently extends substantially perpendicularly to the direction of the movement of the sliding member from the lowered position into the raised position and which is constructed and arranged on the sliding member so as in the lowered position of the sliding member to release the gap between the sliding member and the slotted member and in the raised state of the sliding member to close the gap between the sliding member and the slotted member and to scrape off adhesions on the face of the fixed slotted member facing the sliding member when the sliding member moves from the lowered position into the raised position. Gaps between the slotted members and sliding members extend substantially vertically between the sliding members and slotted members which are arranged parallel with each other.

The resilient lip is in particular arranged on the sliding member in such a manner that, in the lowered position of the sliding member, it extends below a lower side of the slotted member so that a gap between the lower side of the slotted member and resilient lip and consequently also the entrance to the vertical gap between the slotted member and sliding member is released. It has a predetermined spacing with respect to the lower side of the slotted member in a vertical direction. The sliding member has in particular a groove in which the lip is at least partially arranged on the sliding member and is thereby connected to the sliding member. The gap between the slotted member and resilient lip is intended in this instance not to constitute a narrow location for the grey water. The gaps are, for example, therefore similar in terms of their dimensions.

In a horizontal direction, however, the resilient lip covers one lower side of the slotted member in the lowered position of the sliding member only slightly so that, when the sliding member is moved from the lowered position into the raised position, it contacts the face of the slotted member facing the sliding member, becomes slightly resiliently deformed in order to rest in a planar manner on the slotted member and to scrape off remove adhesions to the slotted member. The resilient lip therefore acts as a type of scraper. The resilient deformation is carried out substantially perpendicularly to the plate-like sliding member. Since the resilient lip advantageously extends over the entire width of the sliding member and since the fixed slotted member preferably has the same width as the sliding member which is associated therewith between the side walls of the grey water container, the fixed slotted member is freed from adhesions over the entire width thereof.

At the same time, the fixed slotted member may have a fixed scraper which faces the sliding member and which in particular also extends horizontally and which is constructed to further resiliently deform the resilient lip of the sliding member when the sliding member moves from the raised position into the lowered position and thus to scrape off adhesions to the lip. The fixed scraper is in this instance arranged in such a manner on the slotted member and with respect to the sliding member that the gap between the sliding member and the slotted member is released in the lowered position of the sliding member. The fixed scraper extends in particular above an upper side of the sliding member if the sliding member is in the lowered position. It also has a predetermined minimum spacing, in particular in a vertical direction, with respect to the upper side of the sliding member so that the gap between the sliding member and the slotted member is free.

The fixed scraper forms a projection on the otherwise planar face of the slotted member—in a similar manner to the projection on the otherwise planar face of the sliding member which is formed by the resilient lip. The fixed scraper is in particular arranged in a fixed and rigid manner in the grey water container.

If the resilient lip, when the sliding member moves from the raised position into the lowered position, passes over the scraper, the resilient lip, in particular perpendicularly to the sliding member, becomes further resiliently deformed and adhesions to the lip are released, for example, they are scraped off by the lip. These adhesions are then transported by the surrounding grey water to the base of the grey water container.

According to an advantageous development, an overflow is arranged in the grey water container, in particular in the inlet region of the grey water container. According to an embodiment, it is open in an upward direction.

Another development makes provision for the grey water supply, which is arranged in particular at the cover side, to be directed against a second jet breaker which is arranged in the grey water container and which is accordingly orientated toward the grey water supply so that a grey water jet which is discharged through the grey water supply into the grey water container is split, in particular widely. Furthermore, the second jet breaker is arranged in such a manner with respect to the overflow that it shields the overflow in the direction of the grey water supply. In particular, the second jet breaker is arranged below the grey water supply which is arranged itself, for example, at the cover side, and the second jet breaker is arranged above the overflow which is open in an upward direction. It stops grey water from the grey water supply from flowing directly into the overflow. To this end, it directs the grey water jet from the grey water supply accordingly in directions facing away from the overflow. It can additionally or alternatively also be arranged in front of the opening of the overflow in such a manner that spray water from the jet breaker also does not even reach the overflow. The overflow is intended only to receive grey water which is above the height of the opening of the overflow in the grey water container.

According to another development, a fixed slotted member which faces the inlet region has a guiding sheet which is arranged with respect to a gap between the slotted member and the sliding member which is associated with the slotted member in such a manner that it shields the gap in the direction of the grey water supply. Also in this instance, grey water from the grey water supply or spray water from the second jet breaker is prevented from flowing directly into the gap.

The first and second jet breaker and the guiding sheet are flow guiding sheets for directing the flow of the grey water.

The slotted filter advantageously has a plurality of movable sliding members and accordingly a plurality of fixed slotted members which are associated with the movable sliding members, preferably three in each case.

A rail vehicle according to the invention comprises at least one processing device according to the invention for grey water. For example, it is arranged in a sanitary cubicle, in particular below a washbasin whose grey water the processing device is intended to process.

Advantageously, a plurality of sanitary cubicles have processing devices according to the invention for grey water. These can also be or are used accordingly in the on-board kitchen/galley area.

The rail vehicle may comprise in a development in addition to the processing device for grey water:
at least one fresh water tank,
at least one fresh water outlet location, and
a fresh water supply line between the at least one fresh water tank and the at least one fresh water outlet location,
a fresh water supply line between the at least one fresh water tank and the fresh water supply for supplying fresh water in the outlet region of the grey water container,
at least one grey water inlet location,
at least one outlet location for processed grey water,
a grey water supply line between the at least one grey water inlet location and the grey water supply in the inlet region of the grey water container of the processing device for grey water, and
a supply line for processed grey water between the drain for processed grey water in the outlet region of the grey water container of the processing device for grey water and the at least one outlet location for processed grey water.

In particular, the fresh water supply line branches off from the fresh water tank to the fresh water supply for supplying fresh water in the outlet region of the grey water tank of the processing device for grey water from the fresh water supply line between the fresh water tank and the fresh water outlet location.

The grey water inlet location may, for example, act as a catchment or collection location of grey water. Alternatively, the grey water is produced by the grey water inlet location. A dishwasher or washing machine produces, for example, grey water. A washbasin in contrast catches the grey water which occurs as a result of a hand washing operation. In a development, the grey water inlet location is consequently a washbasin, in particular a sanitary cubicle of the rail vehicle. It may be part of a wash basin module which itself comprises a water tap as a fresh water outlet location which is arranged above the washbasin so that the fresh water coming out of the water tap is collected by the hand basin, whereby it is considered at this time to be grey water and is accordingly subsequently treated as grey water. The rail vehicle may consequently have at least one washbasin module which comprises the fresh water outlet location and the grey water inlet location.

The rail vehicle may in future have at least one black water region with at least one waste water tank and at least one black water inlet location, and a black water line between the black water inlet location and the waste water tank.

According to a development, the cleaning outflow is arranged at the lowest location of the base of the grey water container so that, for so-called frost-protection emptying, it can be almost completely emptied. The cleaning outflow may be connected by means of a black water or waste water line to the waste water tank. The overflow may also be connected to the waste water tank by means of a black water or waste water line.

Furthermore, the rail vehicle may have at least one WC module which comprises the outlet location for processed grey water and the black water inlet location. In a similar manner to the wash basin module, flushing nozzles of the WC module may form the outlet location for processed grey water and a WC bowl forms the black water inlet location. From there, the collected black water is guided to the waste water tank.

Another development of the invention involves the outlet location for processed grey water being arranged above the processing device for grey water. In particular the outlet location for processed grey water is arranged above—that is to say, with spacing counter to gravitational force and consequently in a vertical direction—the drain for processed grey water in the outlet region of the grey water container of the processing device for grey water. In the same manner, the grey water container of the processing device for grey water may be arranged below the grey water inlet location and consequently with spacing in the direction of gravitational force with respect to the grey water inlet location.

In order to convey processed grey water from the drain for processed grey water in the outlet region of the grey water container to the outlet location for processed grey water, a pump may be provided in the supply line for processed grey water between the drain for processed grey water in the outlet region of the grey water container of the processing device for grey water and the outlet location for processed grey water. The term "pump" is intended in this instance to include all the operating machines for conveying fluid.

Alternatively, the supply line for processed grey water between the drain for processed grey water in the outlet region of the grey water container of the processing device for grey water and the outlet location for processed grey water may be free from a pump for conveying processed grey water from the drain for processed grey water in the outlet region of the grey water container of the processing device for grey water to the outlet location for processed grey water. The WC module then comprises a pressurized water generator. The pressurized water generator draws the processed grey water at reduced pressure and can consequently also overcome height differences.

Consequently, no processed grey water remains in the supply line for processed grey water between the drain for processed grey water in the outlet region of the grey water container of the processing device for grey water and the outlet location for processed grey water, which leads to a simple and effective securing of the supply line against frost.

In order to regulate the throughflow of fresh water through the fresh water outlet location and/or the fresh water supply and/or in order to regulate the throughflow of black water through the cleaning outflow, the rail vehicle may have upstream, in particular directly in front, of the fresh water outlet location and/or upstream, in particular directly in front, of the fresh water supply and/or downstream of, in particular directly after, the cleaning outflow at least one blocking member in each case, for example, a valve, for example, in the fresh water supply lines which are arranged upstream or in the black water line which is arranged downstream.

The blocking members in the fresh water supply line between the fresh water tank and the fresh water outlet location and between the fresh water tank and the fresh water supply are in particular provided after a branch in the fresh water supply line to the fresh water outlet location and to the fresh water supply so that both the fresh water supplied to the grey water container and the fresh water supplied to the fresh water outlet location passes in each case at least, in particular in each case only the correspondingly associated blocking member.

In the event that the processing device for grey water does not function or sufficient processed grey water is not available, it must nonetheless be ensured that the WC module is supplied with flushing water.

The filling level sensor detects the filling level of processed grey water in the grey water container and produces a corresponding signal, at least in the event that there is no longer sufficient processed grey water in the grey water container so that the fresh water supply is open until the minimum level has been reached again.

The rail vehicle may comprise a control unit which is constructed to control, at least to open and close, at least the blocking member upstream of the fresh water supply of the grey water container of the processing device for grey water in order to regulate the throughflow of fresh water from the fresh water tank through the fresh water supply in accordance with the signal of the filling level sensor.

The outlet location for processed grey water is in a development free from a direct supply of fresh water from the fresh water tank, with the exception of the fresh water supply to the grey water container which is connected directly by means of a fresh water supply to the fresh water tank. Another supply line is therefore superfluous. Since the fresh water supply is arranged in the outlet region of the grey water container, a lack of processed grey water in the outlet region of the grey water container can be compensated for in a simple manner by means of supplied fresh water.

The blocking member for regulating the throughflow of fresh water through the fresh water outlet location may, for example, be activated manually by means of a user. The blocking member for regulating the throughflow of black water through the cleaning outflow may also be opened and closed by the control unit at predetermined time intervals or manually during maintenance operations.

The blocking member downstream of the cleaning outflow may be constructed as a simple pinch valve.

In a development, the fresh water supply line is between the fresh water tank and the fresh water outlet location free from a pump for conveying fresh water between the fresh water tank and the fresh water outlet location, in particular wherein the fresh water tank of the processing device for grey water is arranged counter to the direction of gravitational force above the fresh water outlet location. It is consequently a so-called falling water system.

Another development of the invention involves dirt filters being provided in the fresh water supply line between the fresh water tank and the fresh water outlet location and/or in the supply line for processed grey water between the drain for processed grey water in the outlet region of the processing device for grey water and the outlet location for processed grey water.

The dirt filter in the fresh water supply line between the fresh water tank and the fresh water outlet location is in particular provided in front of a branch to the fresh water supply for supplying fresh water in the outlet region of the processing device for grey water so that the fresh water which is supplied to the grey water container from the fresh water tank also passes the dirt filter.

The invention permits numerous embodiments. It is explained in greater detail with reference to the following Figures in which one embodiment is illustrated in each case. Elements which are the same in the Figures are given the same reference numerals.

DESCRIPTION OF THE INVENTION

Figure 1:
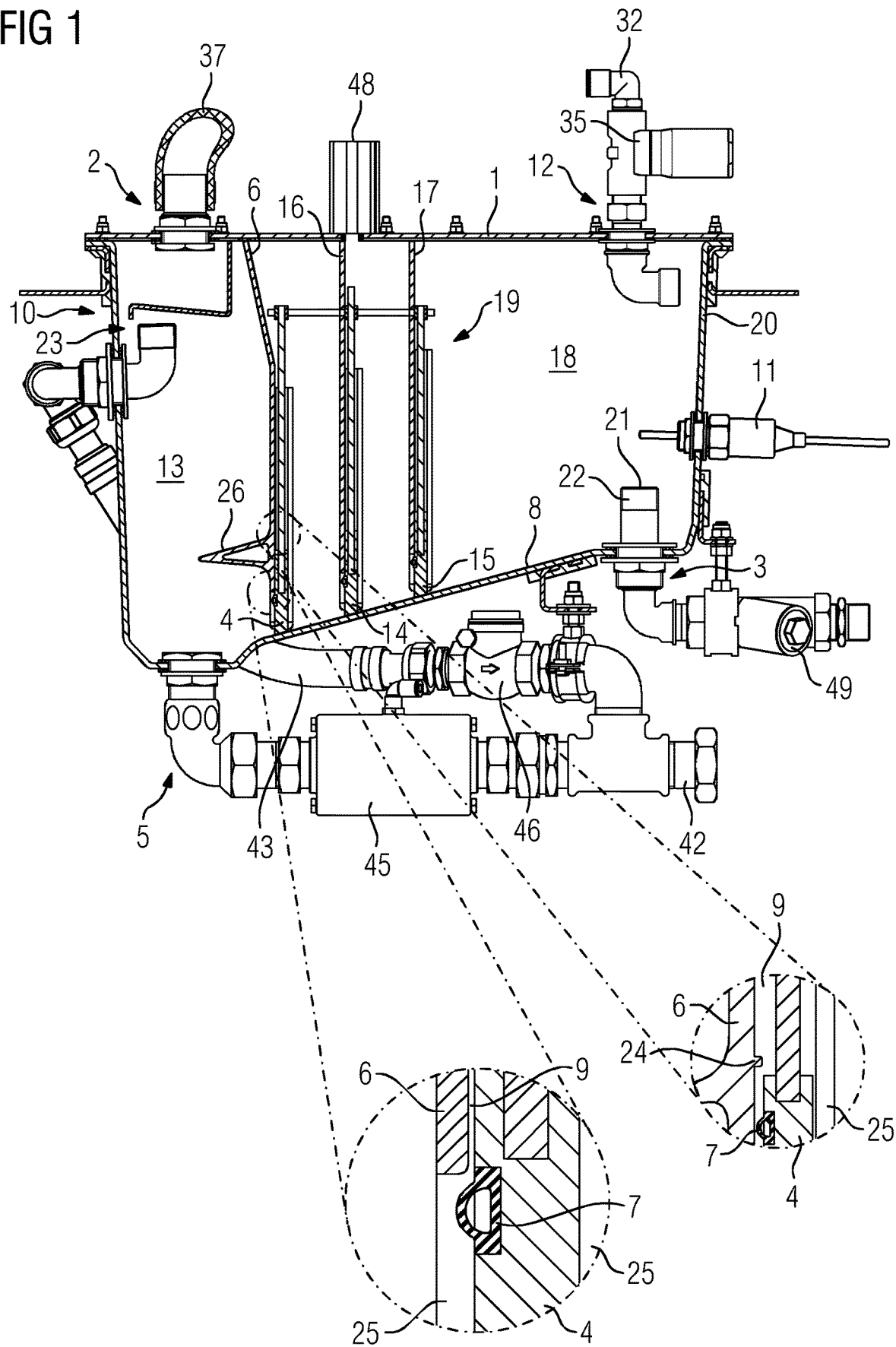
FIG. 1 is a schematic longitudinal section from the side of a processing device according to the invention.

In FIG. 1, a processing device according to the invention is illustrated in longitudinal section.

The processing device for grey water serves to implement a method for sedimentation, which processing device is distinguished in this instance by a longitudinally arranged slotted path and devices for self-cleaning the slotted members.

The processing device comprises a grey water supply 2 in an inlet region 13, a drain 3 for processed grey water in an outlet region 18 and a slotted filter 19 between the inlet and outlet region. The inlet region 13, slotted filter 19 and outlet region 18 are arranged in sequence one behind the other.

The slotted filter 19 comprises in this instance three fixed slotted members 6, 16 and 17 and three movable sliding members 4, 14 and 15 which touch in a lowered position the base 8 of the grey water container 1 and which are raised from it in a raised position.

The base 8 of the grey water container 1 is when viewed from the inlet region 13 constructed to rise in the direction toward the outlet region 18.

A cleaning outflow 5 is arranged at the base side in the inlet region 13, a fresh water supply 12 for supplying fresh water is arranged at the cover side in the outlet region 18.

An overflow 23 is also arranged so as to be open in an upward direction in the inlet region 13, and a jet breaker 10 which is orientated above the overflow 23 in such a manner with respect to the grey water supply 2 that the overflow 23 is shielded in the direction toward the grey water supply 2.

Via the grey water supply 2, the grey water flows into the grey water container 1. The flow is directed against the jet breaker 10 which is constructed to be round in this instance and which divides and brakes the flow in all directions. Below the jet breaker 10 is the overflow 23 so that no water is sprayed into the overflow 23. In the lower region of the inlet region 13 there is additionally a guiding sheet 26 which prevents the flow from flowing directly to the gap 9 between the first slotted member 4 and first sliding member 6.

The three movable sliding members 4, 14 and 15 run in guides 25 and ensure together with the fixed slotted members 6, 16 and 17 that the provided gap dimensions of the gap 9 between slotted members and sliding members are complied with. The sliding members 4, 14 and 15 are guided horizontally in order to carry out a vertical movement. The guides 25 are constructed in this instance as grooves in side walls of the grey water container 1. Alternative forms, such as, for example, guiding rails, are conceivable.

The sliding members 4, 14 and 15 themselves are according to this embodiment mechanically connected to each other by means of a rod assembly so that they can be lifted and lowered together. The rod assembly is to this end connected to a lifting cylinder 48, in this instance a pneumatic lifting cylinder. In place of the pneumatic lifting cylinder, hydraulic or electric actuators can also be used to raise and lower the sliding members 4, 14 and 15, for example, also individually and consequently separately from each other.

In the sliding members 4, 14 and 15 there is provided in each case a groove in which a flexible lip 7 is located. If necessary, the sliding members 4, 14 and 15 can be moved in order to clean the gaps 9. To this end, above the gap 9, another fixed scraper 24 which serves to release the dirt from the flexible lip 7 is fitted to the slotted members 6, 16 and 17.

After the water has passed the three slotted members, it is located in the last chamber—in the so-called outlet region 18 of the grey water container 1, which acts as a reservoir for the WC flushing water. It flows to the WC module via the drain 3 which is extended by a pipe 22 so that the discharged water does not also carry any sediment. The grey water container 1 can be completely emptied via a cleaning outflow 5.

So that there is always sufficient water available to flush the WC module, there is provided a filling level sensor 11 which detects as soon as there is no longer sufficient water in the container 1 so that the fresh water supply 12 is opened until the minimum level is reached. The fresh water supply 12 serves at the same time to clean the container 1 and is directed against the end wall 20 so that the water jet is widely split in order to flush out the sediment with the cleaning outflow 5 open and the sliding members 4, 14 and 15 raised. With the sliding members 4, 14 and 15 raised, the lower end thereof is raised from the base 8 of the grey water container 1. In the lowered position illustrated in this instance, the lower ends of the sliding members 4, 14 and 15 rest on the base 8 of the grey water container 1.

The overflow can be combined with the cleaning outflow outside the grey water container.

There is described a grey water processing device which has no microfilter, which involves minimal maintenance and which cleans itself and during current operation requires no cleaning agent.

The jet breaker 10 brakes the inflow of grey water and distributes it in the inlet region. The overflow 23 is placed under the jet breaker 10 so that no incoming water is directly discharged again. The guiding sheet 26 diverts the flow so that it reaches the gap 9 only later. The resilient lip 7 and scraper 24 as a fixed counter-piece on the slotted members 6, 16 and 17 clean the slotted member gaps 9. The drain pipe 22 with the opening 21 in the raised position and the fresh water supply 12 which is directed against the container wall 20 in order to split the jet also contribute to decreasing the so-called life cycle costs of the processing device according to the invention, as do the features already mentioned above.

The supplies and drains of the grey water container 1 are connected to various lines which are guided outside the grey water container. The grey water supply 2 may thus be connected via a grey water supply line 37 to a washbasin. In the grey water line 37, in this instance there may be provided a non-return valve as an odor trap and as a pressure protection. The overflow 23 is connected to a waste water tank by means of an overflow line 43. In this instance, the overflow line 43 also comprises a non-return valve 46. This valve serves the same purpose and could also be omitted as being redundant. The overflow line 43 opens downstream of the non-return valve 46 in a waste water line 42. This line is itself connected to the cleaning outflow 5. Between the cleaning outflow 5 and the opening of the overflow line 43 in the waste water line 42, a pinch valve is arranged as a blocking member 45 in the waste water line 42. Upstream of the fresh water supply 12 and consequently between the fresh water supply 12 and a fresh water tank there is provided in the fresh water supply line 32 a blocking member 35 via which the fresh water supply to the grey water container 1 can be regulated. Downstream of the drain 3 for processed grey water according to this embodiment a dirt trap 49 is again arranged.

Figure 2:
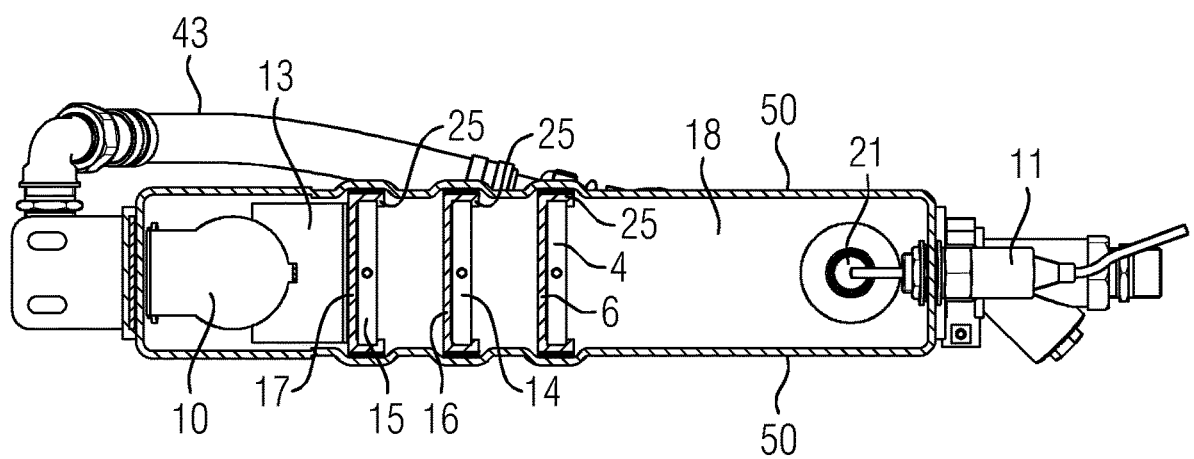
FIG. 2 is a longitudinal section from above of the processing device for grey water from FIG. 1.
Figure 3:
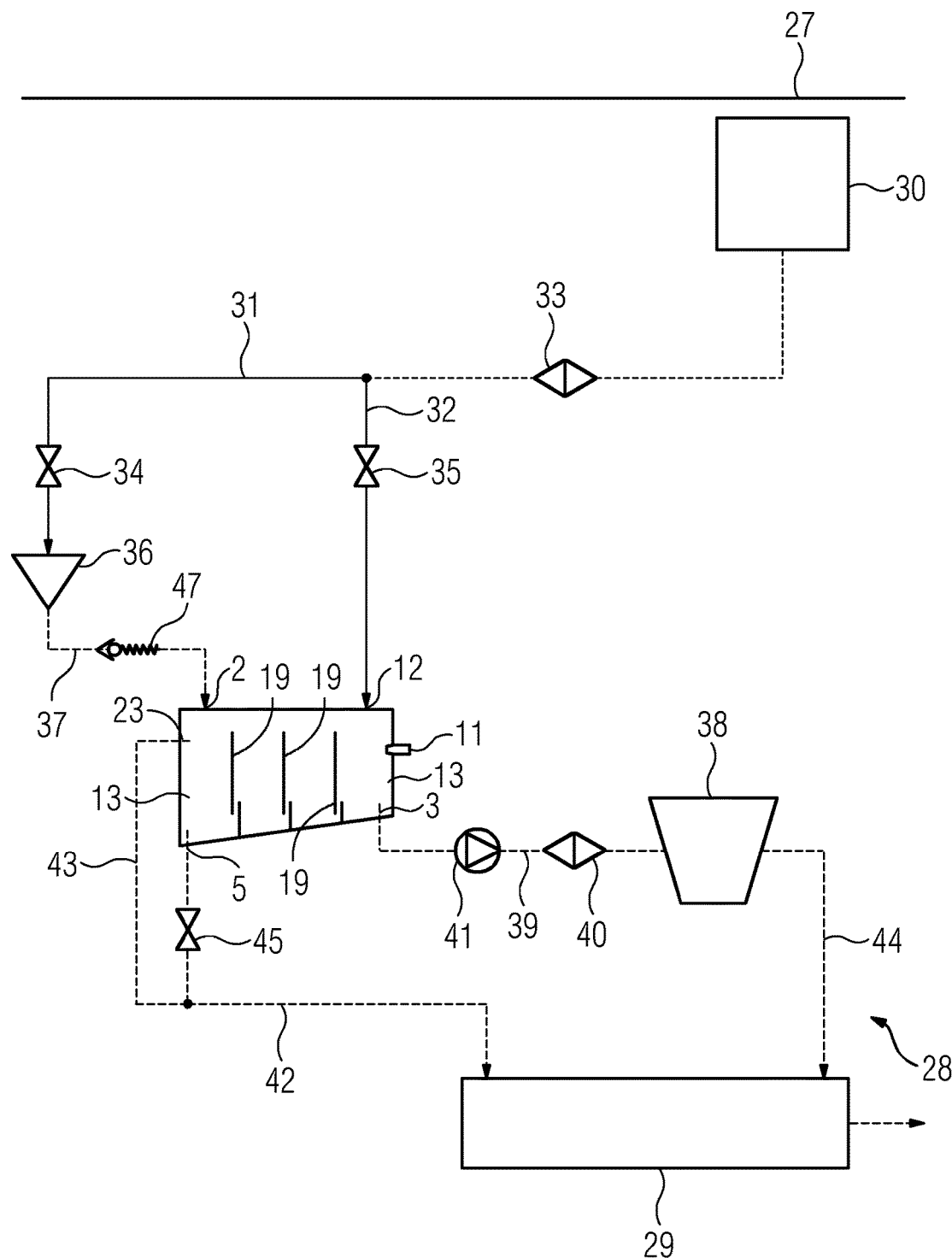
FIG. 3 is a schematic view of a water supply device according to the invention of a rail vehicle having a pump.

FIG. 2 illustrates the processing device for grey water according to FIG. 3 with a longitudinal section from above. It is possible to see clearly the movable sliding members 4, 14 and 15, the corresponding guides 25 on the side walls 50, the fixed slotted members 6, 16 and 17 and the jet breaker 10 in the inlet region 13, the filling level sensor 11 in the outlet region above the opening 21 of the drain pipe 22.

In FIG. 3, a water diagram of a rail vehicle according to the invention with grey water processing and associated peripheral equipment is illustrated. The reference numerals 27 and 28 refer in this instance to a roof 27 of the car body and a base 28 of the car body between which the water supply device of the rail vehicle is arranged for the most part. Only one waste water tank 29 can be arranged below the base 28. In contrast, a fresh water tank 30 is preferably arranged below the roof 27. The fresh water tank 30 may have an opening to the environment of the rail vehicle in order to fill it from the outer side. In a similar manner, the waste water tank 29 may have an opening to the environment of the rail vehicle in order to draw it from the outer side.

Fresh water from the fresh water tank 30 is supplied via a fresh water supply line 31 to a wash basin. The end of the fresh water supply line 31 above the wash basin, from which the fresh water flows into the washbasin, is referred to as a fresh water outlet location, the washbasin acts as a grey water inlet location 36. Beforehand, it passes a dirt filter 33 and a blocking member 34 which is associated with the wash basin as a grey water inlet location 36 and which is arranged directly above the wash basin, for example, a water tap. Between the dirt filter 33 and the blocking member 34, a fresh water supply line 32 branches off from the fresh water supply line 31. This guides fresh water from the fresh water tank 30 to a grey water container 1 of a processing device for grey water.

A fresh water supply 12 of the grey water container 1 for supplying fresh water is arranged in an outlet region 18 of the grey water container 1 of the processing device for grey water. The fresh water supply 12 is connected to the fresh water supply line 32. As soon as the fresh water passes the fresh water supply and reaches the outlet region 18 of the grey water container 1, it is also considered to be grey water. Consequently, the fresh water region when viewed from the fresh water tank 30 ends with the fresh water outlet location, on the one hand, and the fresh water supply 12, on the other hand. In front of the fresh water supply 12 and consequently upstream of the fresh water supply 12 in the fresh water line 32, in particular after the dirt filter 33, a blocking member 35 for regulating the fresh water supply may be arranged in the grey water container 1.

The grey water from the wash basin as a grey water inlet location 36 is directed into the grey water container 1 of the processing device for grey water and cleaned at that location by means of sedimentation of the dirt contained.

To this end, the grey water container 1 of the processing device for grey water in future comprises a grey water supply 2 in an inlet region 13 of the grey water container 1, a drain 3 for processed grey water in the outlet region 18 of the grey water container 1, and at least one filter 19 between an inlet region 13 and outlet region 18 of the grey water container 1.

There is involved in this instance a slotted filter 19 with three fixed slotted members and three movable sliding members which are associated with the slotted members and which in a lowered position touch the base of the grey water container 1 and which in a raised position are raised from it.

A grey water supply line 37 is arranged between the wash basin as a grey water inlet location 36 and the grey water supply 2 in the inlet region 13 of the grey water container 1 of the processing device for grey water. In order to prevent odors from being discharged via the grey water supply line 37 from the grey water container 1 via the wash basin as a grey water inlet location 36 into the inner space of the rail vehicle, the grey water supply line 37 has between the wash basin as a grey water inlet location 36 and the grey water supply 2 of the grey water container 1 a non-return valve 47. In addition to the function as an odor trap, the valve can also act as a pressure protection.

Downstream of the cleaning stages of the filter 19, the processed grey water for a WC module as an outlet location for processed grey water 38 can be removed via a drain 3. Since the processing device for grey water is located below the wash basin as a grey water inlet location 36, this drain 3 can be located below the outlet location for the processed grey water of the WC module, for example, a flushing nozzle or other supply. To this end, there is integrated at this location a pump 41 which pumps the processed grey water to the required height. Behind the pump 41 or also in front of it, there is placed a dirt trap 40 which protects the WC module from excessively large residual particles.

The pump 41 and dirt trap 40 are to this end arranged in a supply line 39 for processed grey water between the drain 3 for processed grey water in the outlet region 18 of the grey water container 1 of the processing device for grey water and the at least one outlet location 38 for processed grey water. The WC module is constructed in such a manner that it is flushed with processed grey water.

The black water which occurs in the WC is discharged via a black water line 44 into the waste water tank 29. In the same manner, the sediment-laden waste water of the grey water container 1 from a cleaning outflow 5 which is arranged at the base side in the inlet region 13 of the grey water container 1 is supplied to the waste water tank 29 via an additional waste water line 42 to which the arranged cleaning outflow 5 and the waste water tank 29 are connected. A blocking member 45, in this instance a pinch valve, below the cleaning outflow 5 releases the waste water flow. Furthermore, the grey water container 1 may have an overflow 23 which is connected to an overflow line 43 which itself opens in the waste water line 42.

So that the WC module always has sufficient water available, even when the wash basin is not regularly used and if the filter 19 of the processing device for grey water is blocked, there is located in the outlet region 18 a filling level sensor 11, in this instance a limit level sensor which detects as soon as it is no longer covered with water. Via the fresh water supply 12 above, fresh water is metered into the grey water container 1 of the processing device for grey water until the filling level sensor 11 is again covered with water.

Figure 4:
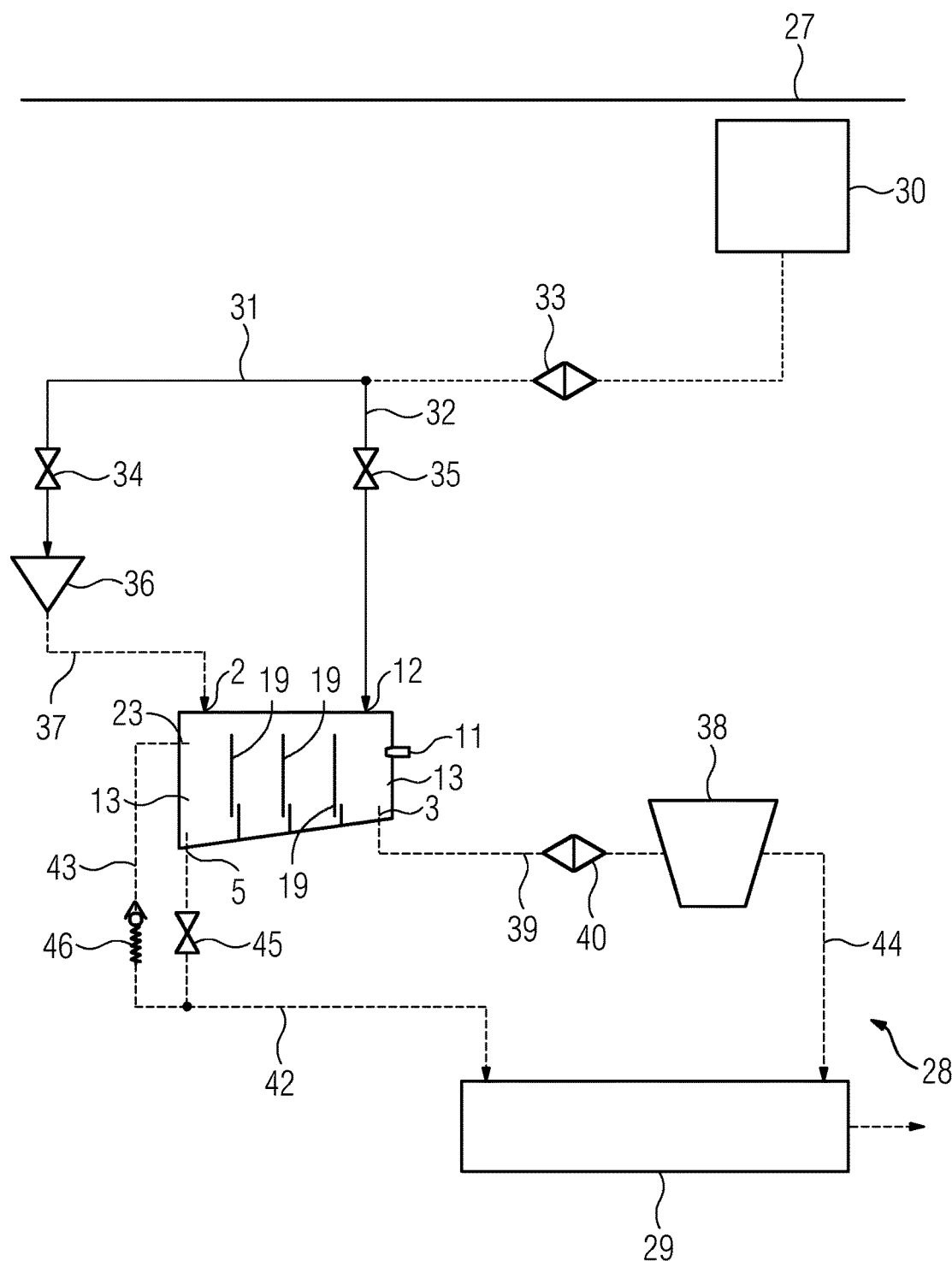
FIG. 4 shows a water diagram without any pump.

FIG. 4 illustrates a variant of the water diagram which does not require any pump since the WC module which is fitted together with the installation contains a pressurized water generator. This draws the water at reduced pressure and can thus bridge height differences. In addition, a non-return valve 46 is provided in the overflow line 43 so that fluid can flow away unimpeded from the grey water container but pressure shocks from the waste water container 29 are kept away from the grey water container. Finally, the overflow line 43 opens downstream of the pinch valve 45 in the waste water line 42. The non-return valve 46 acts as an odor trap and as a pressure protection and is provided as an alternative to the non-return valve 47 from the embodiment according to FIG. 3, which can then be dispensed with.

Figure 5:
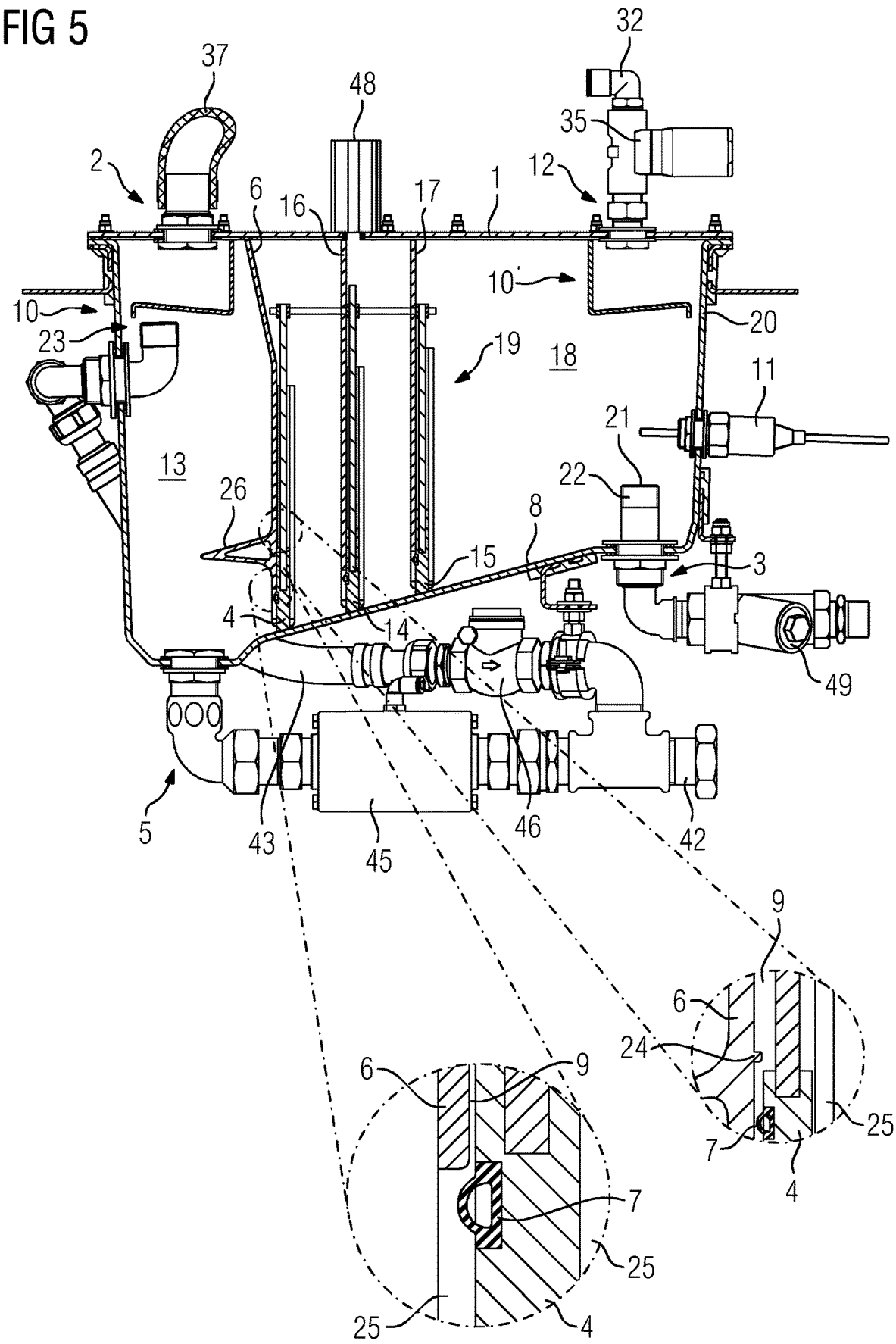
FIG. 5 shows a view similar to FIG. 1 in which a jet breaker is oriented toward a fresh water supply.

FIG. 5 is a view similar to FIG. 1, in which an additional jet breaker 10' is oriented toward the fresh water supply 12.

The invention claimed is:

1. A grey water processing device for a rail vehicle, the processing device comprising:
   a grey water container including an inlet region, an outlet region and a base defining a base side, said base being higher in said outlet region than in said inlet region;
   a grey water supply disposed in said inlet region;
   a drain disposed in said outlet region for grey water processed in said grey water container, said drain having an opening for passage of processed grey water into said drain, said opening being spaced apart from said base of said grey water container, and said drain having a pipe guided through said base of said grey water container and protruding into said grey water container;
   a slotted filter disposed between said inlet region and said outlet region, said slotted filter having at least one sliding member being movable between a lowered position touching said the base and a raised position raised from said base, and said slotted filter having at least one fixed slotted member;
   said at least one fixed slotted member and said at least one sliding member being disposed relative to each other in said grey water container to form a gap between said at least one fixed slotted member and said at least one sliding member at least in said lowered position of said at least one sliding member to cause grey water in said inlet region intended to be filtered to flow through said gap to reach said outlet region;
   said at least one sliding member having a face facing said at least one fixed slotted member and a resilient lip disposed on said face;
   said resilient lip scraping off adhesions on said face of said at least one fixed slotted member facing said at least one sliding member upon said sliding member moving from said lowered position into said raised position;
   a cleaning outflow disposed at said base side in said inlet region; and
   a fresh water supply disposed in said outlet region for supplying fresh water.

2. The grey water processing device according to claim 1, wherein said fresh water supply is directed against a wall of said grey water container.

3. The grey water processing device according to claim 1, wherein said grey water container has mutually parallel side walls between said inlet region and said outlet region, and said at least one sliding member is plate-shaped and is disposed perpendicularly to said side walls.

4. The grey water processing device according to claim 3, wherein said side walls have guides for guiding said at least one sliding member.

5. The grey water processing device according to claim 1, wherein said at least one fixed slotted member has a fixed scraper facing said at least one sliding member, resiliently deforming said resilient lip of said at least one sliding member upon said sliding member moving from said raised position into said lowered position, scraping off adhesions on said lip releasing said gap between said at least one sliding member and said at least one slotted member in said lowered state of said at least one sliding member.

6. The grey water processing device according to claim 1, which further comprises:
   a jet breaker disposed in said grey water container and orientated toward said grey water supply, said grey water supply being directed against said jet breaker for splitting a grey water jet discharged through said grey water supply into said grey water container; and
   an overflow, said jet breaker shielding said overflow in a direction of said grey water supply.

7. The grey water processing device according to claim 1, wherein said at least one movable sliding member includes at least three movable sliding members.

8. The grey water processing device according to claim 1, which further comprises a filling level sensor disposed in said outlet region.

9. A rail vehicle, comprising at least one grey water processing device according to claim 1.

10. The grey water processing device according to claim 1, wherein said grey water container has an elongated shape with said inlet region at one side, said outlet region at another side and said slotted filter between said inlet region and said outlet region.

11. A grey water processing device for a rail vehicle, the processing device comprising:
   a grey water container including an inlet region, an outlet region and a base defining a base side, said base being higher in said outlet region than in said inlet region;
   a grey water supply disposed in said inlet region;
   a drain disposed in said outlet region for grey water processed in said grey water container, said drain having an opening for passage of processed grey water into said drain, said opening being spaced apart from said base of said grey water container, and said drain having a pipe guided through said base of said grey water container and protruding into said grey water container;
   a slotted filter disposed between said inlet region and said outlet region, said slotted filter having at least one sliding member being movable between a lowered position touching said the base and a raised position raised from said base;
   said slotted filter including at least one fixed slotted member facing said inlet region;
   said at least one fixed slotted member and said at least one sliding member defining a gap therebetween; and
   said at least one fixed slotted member having a guiding sheet shielding said gap in a direction of said grey water supply;
   a cleaning outflow disposed at said base side in said inlet region; and
   a fresh water supply disposed in said outlet region for supplying fresh water.

* * * * *